Nov. 13, 1951 D. METTETAL, JR 2,575,183
TOW BAR BRAKE ACTUATOR
Filed July 12, 1949 2 SHEETS—SHEET 1
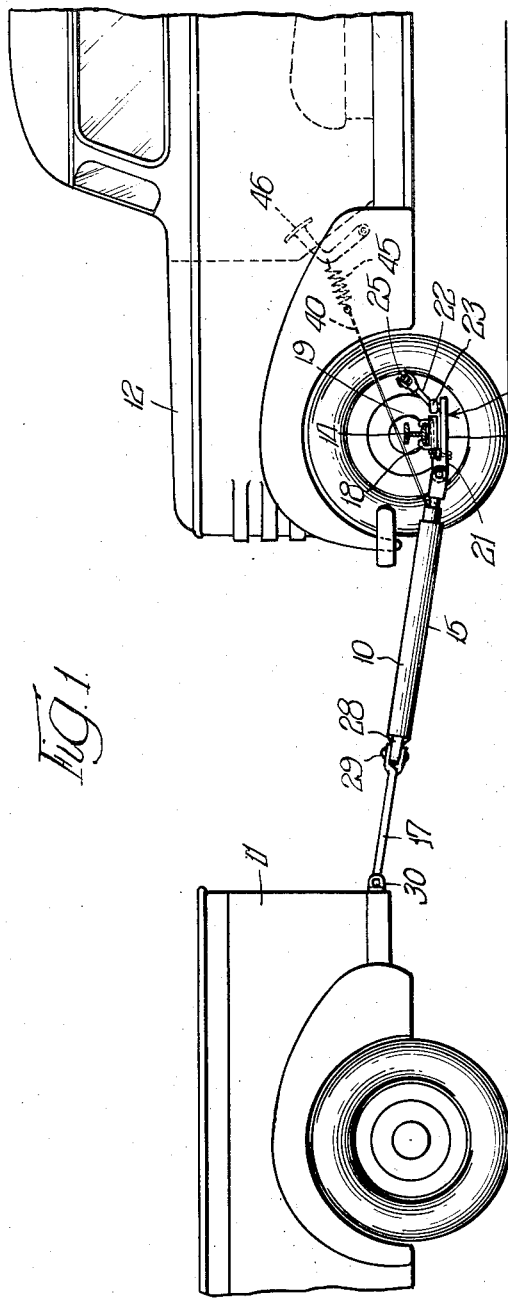
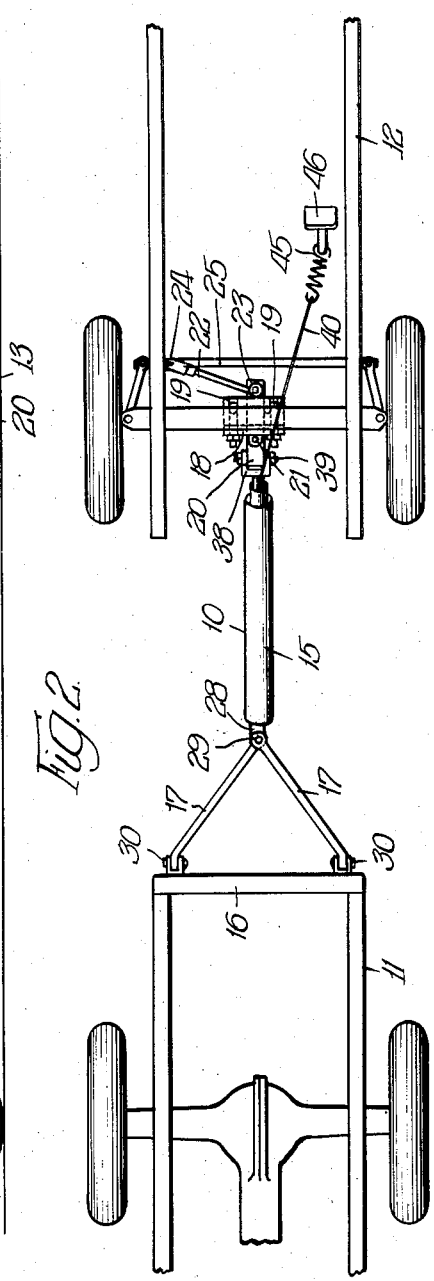
INVENTOR.
Donald Mettetal, Jr.,
BY
Cromwell, Greist & Warden
Attys.

Nov. 13, 1951  D. METTETAL, JR  2,575,183
TOW BAR BRAKE ACTUATOR
Filed July 12, 1949  2 SHEETS—SHEET 2
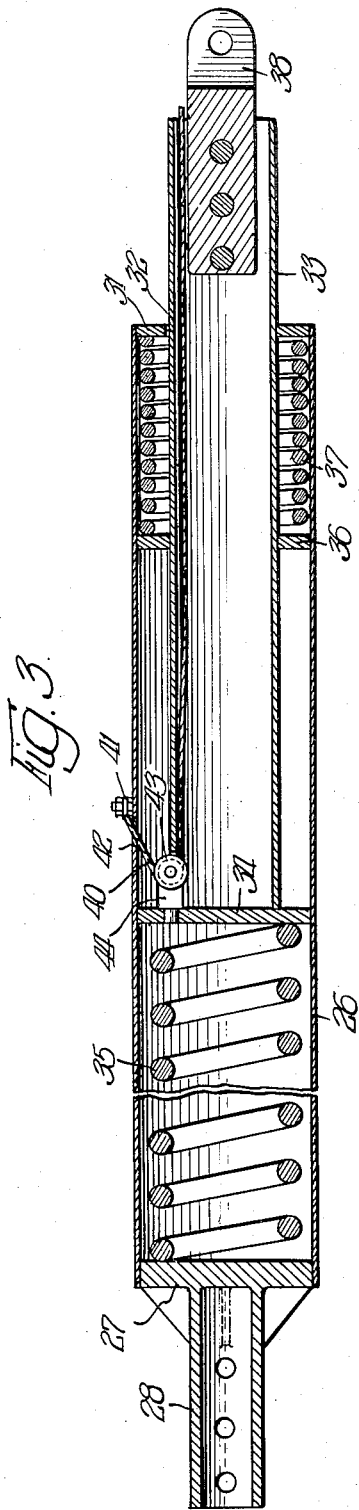
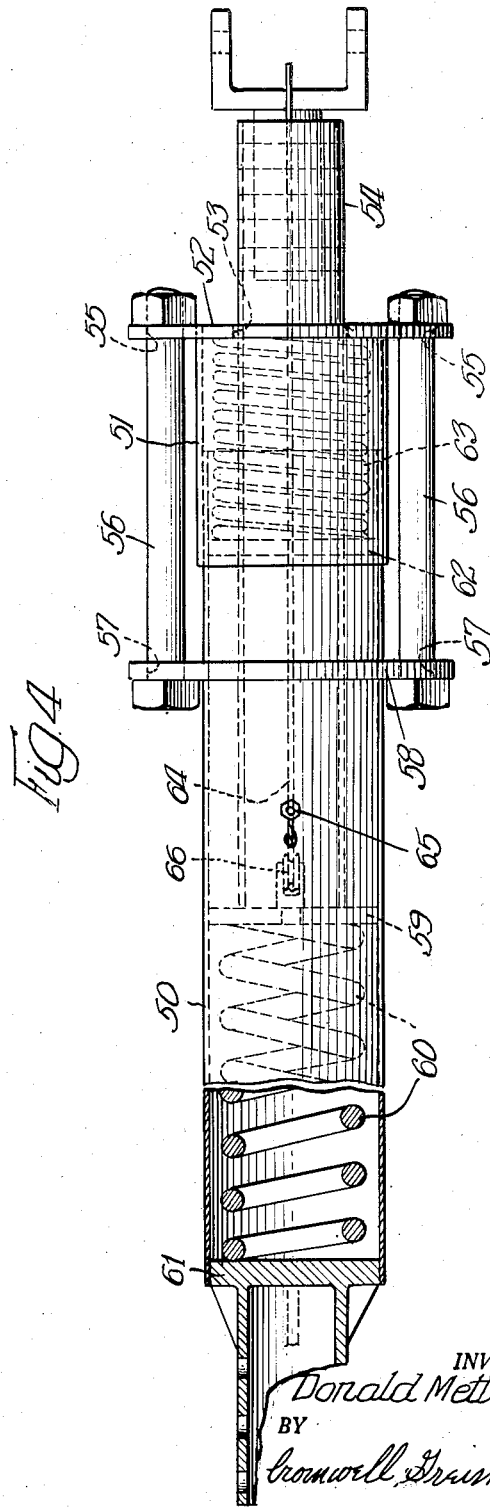
INVENTOR.
Donald Mettetal, Jr.,
BY
Cromwell, Greist & Warden
Attys

Patented Nov. 13, 1951

2,575,183

UNITED STATES PATENT OFFICE 2,575,183

TOW-BAR BRAKE ACTUATOR

Donald Mettetal, Jr., Chicago, Ill.

Application July 12, 1949, Serial No. 104,213

2 Claims. (Cl. 188—112)

This invention is concerned with improvements in devices for connecting two vehicles together so that one of the vehicles may be hauled or towed by the other in a safe and efficient manner.

It is an object of the invention to provide a mechanism for connecting a towed and a towing vehicle which mechanism has incorporated therein a braking device permitting limited movement of the vehicles relative to each other when the speed of either vehicle is changed.

It is a further object of the invention to provide a mechanism for connecting two vehicles so that one vehicle may tow the other in which mechanism a braking device is incorporated which is characterized by relatively movable members having a cushioning means which permits the towed vehicle to move a predetermined distance toward the towing vehicle upon the slowing down or sudden stopping of the towing vehicle without disconnecting the vehicles and without danger of damage due to their colliding with each other.

It is another object of the invention to provide a tow-bar mechanism for vehicles including a surge brake wherein the latter incorporates a pair of elongate members slidably connected and having compressible means resisting movement toward each other and a brake operating connecting means activated by predetermined movement of the surge brake members for operating the brakes on the towed vehicle.

It is a more specific object of the invention to provide in a tow-bar mechanism for vehicles a braking device comprising telescoping tubular members having compression springs limiting the telescoping movement of the tubular members toward and from each other and a tension cable connected at one end to the brake mechanism of the towed vehicle and at the other end to the telescoping members whereby predetermined movement of the telescoping members will apply the brakes on the towed vehicle.

These and other objects of the invention will be apparent from a consideration of the devices which are shown by way of example in the accompanying drawings, wherein:

Fig. 1 is a side elevation, largely schematic, of portions of two vehicles which are connected by a mechanism incorporating the principles of the invention;

Fig. 2 is a plan view of the connected vehicles;

Fig. 3 is a longitudinal section through the braking device; and

Fig. 4 is a longitudinal section similar to Fig. 3, showing a modified form of the braking device.

Referring to the drawings, there is illustrated a towing mechanism 10 which is attached to and forms a connection between the rear of a towing vehicle 11 and the front of a towed vehicle 12. The towing mechanism 10 is particularly designed to provide a safe and efficient connecing link between the two vehicles 11 and 12 so that the vehicles may be operated at normal speeds without danger of damaging either vehicle upon abrupt changes in speed or sudden stopping of the towing vehicle. The mechanism 10 is effective to prevent damage to the vehicles which might otherwise be caused through collision between the vehicles or disconnecting of the vehicles while they are moving over the highway.

The towing mechanism 10 comprises the tow-bar device 13 which is attached to a front cross frame member 14 of the towed car 12 and a braking device 15 which is secured at one end to the tow-bar 13 and at the other end to a cross frame portion 16 by means of a pair of connecting link bars 17.

The tow-bar device 13 consists of a base clamp 18, a pair of slidable jaw members 19 adapted to cooperate therewith to clamp the device to the frame member 14, a bottom bar 20 swingably mounted at the forward end 21 to the base clamp 18 and an adjustable link bar 22 connected at opposite ends by means of universal joints to the rearward end 23 of the bottom bar 20 and to a clamp 24, respectively, the clamp 24 being secured to the radius rod 25 which controls the steering mechanism of the towed car 12.

The braking device 15 comprises an elongate tubular section 26 which constitutes the outer casing of the device. The casing 26 is closed at one end by a plug or cap 27 having extending outwardly in an axial direction therefrom a bracket 28 which is adapted to be pivotally attached by bolt 29, or the like, to the rearward ends of connecting link bars 17 which are pivotally attached at their other ends to U-shaped brackets 30 by bolts or the like. The bracket members 30 are secured to the cross frame member 16 of the towing car 11 in any convenient manner.

The tubular casing 26 is provided at its opposite end with a cap or plug 31 having a central aperture 32 which is adapted to receive an inner tubular plunger member 33 of a diameter somewhat less than the diameter of the outer casing 26. At its inner or rearward end the plunger member 33 is provided with a circular end plate 34 having close sliding fit with the interior surface of the outer casing member 26. A compression spring 35 of substantial length is arranged between the end plate 34 and the end cap 27 in the forward end of the casing 26. The spring 35 resists movement of the plunger member 33 inwardly within the casing 26 in the axial direction thereof. The plunger member 33 is also provided with an abutment or shoulder forming ring 36 which is secured in encompassing relation to the member 33 a predetermined distance from the end plate 34. A compression spring 37 is arranged between the shoulder forming plate 36 on the plunger member 33 and the end plate 31 on the outer casing 26. The compression spring 37 is adapted to resiliently resist movement of the inner plunger member 33 in the direction outwardly of the outer casing 26. The plunger member 33 is provided at its outer end with a clevis 38 which is adapted to be pivotally secured at 39 to the forward end of the bottom member 20 of the tow-bar device 13.

One end of a brake operating cable 40 is anchored at 41 to the outer casing 26 and extends through aperture 42 into the casing 26 and around a pulley 43 which is secured by a bracket 44 to the end plate 34 of the plunger 33. The cable 40 extends interiorly of the plunger 33 and is free to move within the same. The other end of the cable 40 is connected by a spring hook 45 to the conventional brake pedal 46 of the towed vehicle 12.

With the mechanism connecting the vehicles 11 and 12 as shown, a sudden reduction in speed of the towing vehicle 11 will cause the towed vehicle 12 to surge forward. Any forward movement is resisted by the operation of the braking device 15. The movement of the towed car 12 toward the towing car 11 causes the inner plunger member 33 to move inwardly of the outer casing 26 against the resistance of the compression spring 35. The relative movement of the towing vehicle toward the towed vehicle is limited by the compression of the spring 35. Upon movement of the end plate 34 toward the closed end 27 of the outer casing 26, the pulley 43 causes the slack to be taken up on the cable 40 and applies a pull on the brake pedal 46, causing the brakes on the towed car 12 to be operated and to assist in slowing down or stopping the towed car and relieving the pressure on the connecting link bars 17.

When the vehicles are operated in a manner which causes the towed vehicle 12 to tend to move away from the towing vehicle 11 the compression spring 37 resists movement of the inner plunger member 33 axially outwardly of the outer casing 26 and permits a limited separation of the vehicles 11 and 12 without disconnection of the same. The spring 37 functions as a damper for cushioning the movement between the vehicles upon acceleration of the towing vehicle.

A modified form of the braking device is illustrated in Fig. 4. In this form of the device the outer casing 50 is provided with a cap 51 having an end plate 52. The end plate 52 is centrally apertured at 53 to slidingly receive the inner plunger member 54. The external diameter of the end plate 52 is sufficient to provide for apertures 55 for receiving bolts 56 in slidable relation. The bolts 56 are headed and extend through apertures 57 in an abutment plate 58 which is secured to the outer casing 50 a predetermined distance from the forward end of the device. The inner plunger member 54 is provided with an end plate 59 which engages one end of the compression spring 60 arranged between the plate 59 and the forward end cap 61 on the outer casing 50. The inner plunger member 54 is provided with an abutment ring 62 which engages one end of the compression spring 63 arranged between the ring 62 and the end plate 52 on the cap 51. A brake operating cable 64 is attached to the outer casing 50 at 65 and extends over pulley 66 within the inner plunger member 54. The other details of the modified form are the same as in the form previously described. The operation of the modified form of the device is the same as the operation of the previously described form except for the absence of the dampening spring 37. There is nothing to cushion the relative movement of the vehicles upon acceleration of the towing vehicle.

While specific details of construction have been referred to in describing the illustrated forms of the device, it will be understood that other details of construction may be resorted to within the spirit of the invention.

I claim:

1. In a mechanism for connecting two vehicles whereby one of the vehicles may be towed by the other, a braking device comprising a tubular casing having cap members closing the opposite ends thereof, one of said cap members being provided with a central aperture, a slidable tubular plunger member extending through said aperture, said plunger member being provided on its inner end with a circular end plate having a sliding fit in said tubular casing, a cushioning means between said end plate and the other of said casing cap members, an abutment member on said plunger member, a cushioning means extending between said abutment member and said apertured cap member, a cable member having one end secured to said casing and slidably connected with said plunger, the other end of said cable member being adapted to be secured to a brake operating member on the vehicle being towed, and means at the opposite ends of said braking device for connecting the same to the respective vehicles whereby upon relative movement of the vehicles toward each other said plunger member will move inwardly toward the end of said device against the operation of said cushioning means and said cable will be drawn taut by movement of said plunger member to operate the brake on the vehicle being towed.

2. In a mechanism for connecting two vehicles whereby one of the vehicles may be towed by the other, a braking device comprising a tubular casing having cap members closing the opposite ends thereof, one of said cap members being provided with a central aperture, a slidable tubular plunger member extending through said aperture, said plunger member being provided on its inner end with a circular end plate having a sliding fit in said tubular casing, a compression spring between said end plate and the other of said casing cap members, a cable member having one end secured to said tubular casing and the other end adapted to be secured to a brake operating member on the vehicle being towed, said cable member extending through said tubular plunger and having a sliding connection therewith, and means at the opposite ends of said braking device for connecting the same to the respective vehicles whereby upon relative movement of the vehicles toward each other said plunger member will move inwardly toward the end of said device against the operation of said compression spring and said cable will be drawn taut by movement of said plunger member to operate the brake on the vehicle being towed.

DONALD METTETAL, Jr.

REFERENCES CITED

The following references are of record in the file of this patent:

UNITED STATES PATENTS

| Number | Name | Date |
|---|---|---|
| 1,879,981 | Hamilton | Sept. 27, 1932 |
| 2,040,728 | Bulmer | May 12, 1936 |
| 2,221,929 | Snider | Nov. 19, 1940 |
| 2,522,855 | Brown | Sept. 19, 1950 |

FOREIGN PATENTS

| Number | Country | Date |
|---|---|---|
| 172,303 | Great Britain | Nov. 29, 1921 |